United States Patent
Yun et al.

(10) Patent No.: US 11,355,745 B2
(45) Date of Patent: Jun. 7, 2022

(54) NICKEL ACTIVE MATERIAL PRECURSOR FOR LITHIUM SECONDARY BATTERY, METHOD FOR PRODUCING NICKEL ACTIVE MATERIAL PRECURSOR, NICKEL ACTIVE MATERIAL FOR LITHIUM SECONDARY BATTERY PRODUCED BY METHOD, AND LITHIUM SECONDARY BATTERY HAVING CATHODE CONTAINING NICKEL ACTIVE MATERIAL

(71) Applicant: Samsung SDI Co., Ltd., Yongin-si (KR)

(72) Inventors: Pilsang Yun, Yongin-si (KR); Hyunbeom Kim, Yongin-si (KR); Hyundeok Lee, Yongin-si (KR); Minah Cha, Yongin-si (KR); Wooyoung Yang, Yongin-si (KR); Jangsuk Hyun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 356 days.

(21) Appl. No.: 16/463,824

(22) PCT Filed: Dec. 4, 2017

(86) PCT No.: PCT/KR2017/014105
§ 371 (c)(1),
(2) Date: May 23, 2019

(87) PCT Pub. No.: WO2018/101809
PCT Pub. Date: Jun. 7, 2018

(65) Prior Publication Data
US 2019/0386298 A1    Dec. 19, 2019

(30) Foreign Application Priority Data
Dec. 2, 2016 (KR) .................... 10-2016-0163898

(51) Int. Cl.
*H01M 4/00* (2006.01)
*H01M 4/36* (2006.01)
(Continued)

(52) U.S. Cl.
CPC ............ *H01M 4/366* (2013.01); *C01G 53/04* (2013.01); *H01M 4/505* (2013.01); *H01M 4/525* (2013.01);
(Continued)

(58) Field of Classification Search
CPC ...... H01M 4/366; H01M 4/505; H01M 4/525; H01M 10/0525; H01M 2004/028; C01G 53/04; C01P 2004/61; C01P 2004/40
See application file for complete search history.

(56) References Cited

U.S. PATENT DOCUMENTS 9,559,351 B2   1/2017  Mori et al.
10,020,507 B2  7/2018  Kobayashi et al.
(Continued)

FOREIGN PATENT DOCUMENTS

CN  102631875 A  8/2012
CN  102956883 A  3/2013
(Continued)

OTHER PUBLICATIONS

Korean Office Action dated Jan. 29, 2020, for corresponding Korean Patent Application No. 10-2017-0165239, 7 pages.
(Continued)

*Primary Examiner* — Milton I Cano
*Assistant Examiner* — Mary G Henshaw
(74) *Attorney, Agent, or Firm* — Lewis Roca Rothgerber Christie LLP

(57) ABSTRACT

Provided are a nickel-based active material precursor for a lithium secondary battery including: a first porous core; a second core located on the first porous core and having a
(Continued)

higher density than that of the first porous core, a shell located on the second core; and having a radial arrangement structure, wherein an amount of nickel included in the first porous core is greater than or equal to an amount of nickel included in the second core, and the amount of nickel included in the second core is greater than an amount of nickel included in the shell, a method of producing the nickel-based active precursor, a nickel-based active material for a lithium secondary battery, obtained from the nickel-based active precursor, and a lithium secondary battery including a cathode containing the nickel-based active material.

14 Claims, 5 Drawing Sheets

(51) Int. Cl.

| | | |
|---|---|---|
| *C01G 53/04* | (2006.01) | |
| *H01M 4/505* | (2010.01) | |
| *H01M 4/525* | (2010.01) | |
| *H01M 10/0525* | (2010.01) | |
| *H01M 4/02* | (2006.01) | |

(52) U.S. Cl.
CPC ..... *H01M 10/0525* (2013.01); *C01P 2004/61* (2013.01); *C01P 2006/40* (2013.01); *H01M 2004/028* (2013.01)

(56) References Cited

U.S. PATENT DOCUMENTS

| | | | |
|---|---|---|---|
| 10,522,823 | B2 | 12/2019 | Kim et al. |
| 10,581,110 | B2 | 3/2020 | Kwon et al. |
| 2014/0131616 | A1 | 5/2014 | Sun et al. |
| 2016/0036041 | A1 | 2/2016 | Uwai et al. |
| 2016/0093885 | A1 | 3/2016 | Kamata et al. |
| 2016/0190573 | A1 | 6/2016 | Sun et al. |
| 2016/0218350 | A1 | 7/2016 | Noh et al. |
| 2016/0359165 | A1 | 12/2016 | Kim et al. |
| 2017/0092935 | A1* | 3/2017 | Sun .................. C01G 53/00 |
| 2017/0222221 | A1 | 8/2017 | Park et al. |
| 2018/0108940 | A1 | 4/2018 | Kwon et al. |
| 2019/0036112 | A1* | 1/2019 | Aida .................. H01M 4/525 |
| 2019/0379043 | A1* | 12/2019 | Toma .................. C01G 53/04 |

FOREIGN PATENT DOCUMENTS

| | | |
|---|---|---|
| CN | 105993090 A | 10/2016 |
| EP | 3016183 A2 | 5/2016 |
| EP | 3016183 A3 | 8/2016 |
| JP | 2001-243951 A | 9/2001 |
| JP | 2014-040363 A | 3/2014 |
| JP | 2014-506388 A | 3/2014 |
| JP | 2015-76397 A | 4/2015 |
| KR | 10-0752703 61 | 8/2007 |
| KR | 10-0752703 B1 | 8/2007 |
| KR | 10-2012-0079802 A | 7/2012 |
| KR | 10-2013-0129449 A | 11/2013 |
| KR | 10-2015-0016125 A | 2/2015 |
| KR | 10-2016-0006172 A | 1/2016 |
| KR | 10-2016-0032787 A | 3/2016 |
| KR | 10-2016-0049995 A | 5/2016 |
| KR | 10-2016-0129764 A | 11/2016 |
| WO | 2014/142279 A1 | 9/2014 |
| WO | 2016/052820 A1 | 4/2016 |

OTHER PUBLICATIONS

EPO Extended Search Report dated Jul. 3, 2020, for corresponding European Patent Application No. 17875871.0 (6 pages).
Japanese Office Action dated Jul. 6, 2020, for corresponding Japanese Patent Application No. 2019-529235 (7 pages).
Korean Registration Determination Certificate dated Aug. 18, 2020, for corresponding Korean Patent Application No. 10-2017-0165239 (2 pages).
International Search Report for International Application No. PCT/KR2017/014105, dated Mar. 14, 2018, 9pp.
Office action corresponding to CN Patent Application No. 201780074923.3, dated Oct. 25, 2021, including English translation 15pp.

\* cited by examiner (A)　　　　　　　　(B)　　　　　　　　(C)

NICKEL ACTIVE MATERIAL PRECURSOR FOR LITHIUM SECONDARY BATTERY, METHOD FOR PRODUCING NICKEL ACTIVE MATERIAL PRECURSOR, NICKEL ACTIVE MATERIAL FOR LITHIUM SECONDARY BATTERY PRODUCED BY METHOD, AND LITHIUM SECONDARY BATTERY HAVING CATHODE CONTAINING NICKEL ACTIVE MATERIAL

CROSS-REFERENCE TO RELATED APPLICATION(S)

This application is a National Phase Patent Application of International Patent Application Number PCT/KR2017/014105, filed on Dec. 4, 2017, which claims priority of Korean Patent Application No. 10-2016-0163898, filed Dec. 2, 2016. The entire contents of both of which are incorporated herein by reference.

TECHNICAL FIELD

The present disclosure relates to nickel-based active precursors for lithium secondary batteries, methods of producing the same, nickel-based active materials for lithium secondary batteries produced therefrom, and lithium secondary batteries including cathodes containing the nickel-based active materials.

BACKGROUND ART

With the development of portable electronic devices, communication devices, and the like, there is an increasing demand for lithium secondary batteries having high energy density.

Lithium nickel manganese cobalt composite oxides, lithium cobalt oxides, and the like have been used as cathode active materials of lithium secondary batteries. However, when such cathode active materials are used, cracks occur in primary particle units with repeated charging and discharging, thereby reducing the long lifespan of a lithium secondary battery, increasing battery resistance, and failing to satisfy desired battery capacity characteristics. Therefore, there is a need to improve these characteristics. In addition, when an amount of nickel is increased to manufacture a cathode active material having a high capacity, NiO is formed on a surface, and this formation causes a structural collapse and deterioration of lifespan upon charging and discharging of a battery.

DESCRIPTION OF EMBODIMENTS

Technical Problem

Provided is a nickel-based active material precursor for a lithium secondary battery having an increased lithium ion utilization rate and an increased lifespan with a stabilized surface.

Provided is a method of producing the nickel-based active material precursor.

Provided is a nickel-based active material obtained from the nickel-based active material precursor and a lithium secondary battery including a cathode containing the nickel-based active material.

Solution to Problem

According to an aspect of the present disclosure, a nickel-based active material precursor for a lithium secondary battery includes:
a first core which porous;
a second core located on the first core and having a higher density than that of the first core; and
a shell located on the second core and having a radial arrangement structure,
wherein an amount of nickel included in the first core is greater than or equal to an amount of nickel in the second core, and the amount of nickel included in the second core is greater than an amount of nickel in the shell.

According to another aspect of the present disclosure, a method of producing a nickel-based active material precursor for a lithium secondary battery includes:
a first step of forming a first core which is porous; and
a second step of forming a second core located on the first core and having a higher density than that of the first core,
wherein the nickel-based active material precursor includes a shell located on the second core and having a radial arrangement structure,
an amount of nickel in the first core is greater than or equal to an amount of nickel in the second core, and the amount of nickel in the second is greater than an amount of nickel in the shell, and
i) a reaction mixture in each process has a pH of 10 to 12, and a nickel raw material is supplied in the third step at a speed that is decreased as compared with a speed at which a nickel raw material is supplied in the first step and the second step, or
ii) a reaction mixture in each step has a pH of 10 to 12, and a metal raw material is supplied in the second step at a speed that is increased as compared with a speed at which a nickel raw material is supplied in the first step while a metal raw material is supplied in the third step at a speed that is equal to or decreased as compared with a speed at which a metal raw material is supplied in the second step.

In the method of producing the nickel-based active material precursor, when the speed at which a metal raw material is supplied in the third step is equal to the speed at which a metal raw material is supplied in the second step, the pH of the reaction mixture in the third step is lower than that of the reaction mixture in the second process by 0.4 to 0.6.

According to another aspect of the present disclosure, a nickel-based active material is obtained from the nickel-based active precursor.

According to another aspect of the present disclosure, a lithium secondary battery includes a cathode containing the nickel-based active material for a lithium secondary battery.

Advantageous Effects of Disclosure

In a nickel-based active material precursor for a lithium secondary battery according to an embodiment, a diffusion distance of lithium is decreased such that efficiency of the nickel-based active material precursor is increased. In addition, by forming a shell containing nickel on a surface in a small amount, lifespan characteristics of the nickel-based active material precursor are improved. By using a cathode including a nickel-based active material obtained from the nickel-based active material precursor, a lithium secondary battery having increased discharge capacity, improved charge/discharge efficiency, and a long lifespan may be manufactured.

MODE OF DISCLOSURE

Hereinafter, a nickel-based active material precursor for a lithium secondary battery, a method for producing the same, and a lithium secondary battery including a cathode containing the nickel-based active material precursor according to the present disclosure will be described in detail with reference to the accompanying drawings.

Figure 1A:
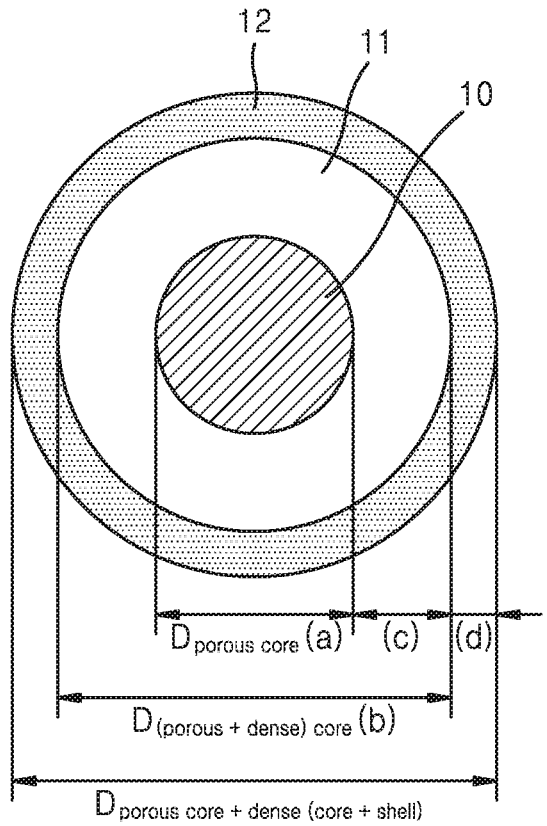
FIG. 1A schematically illustrates a structure of a nickel-based active material precursor according to an embodiment.
Figure 1B:
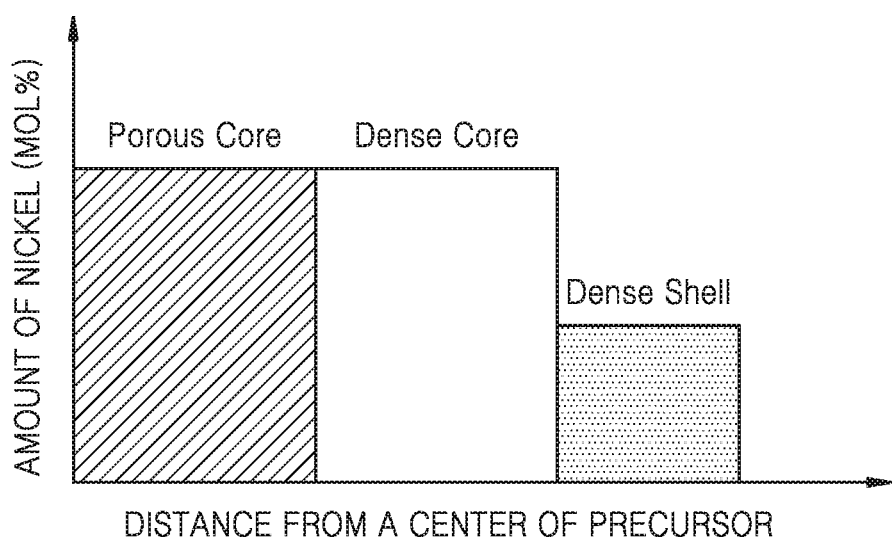
FIG. 1B is a graph showing changes in amounts of nickel according to a distance from a core in a nickel-based active precursor according to an embodiment.
Figure 2A:
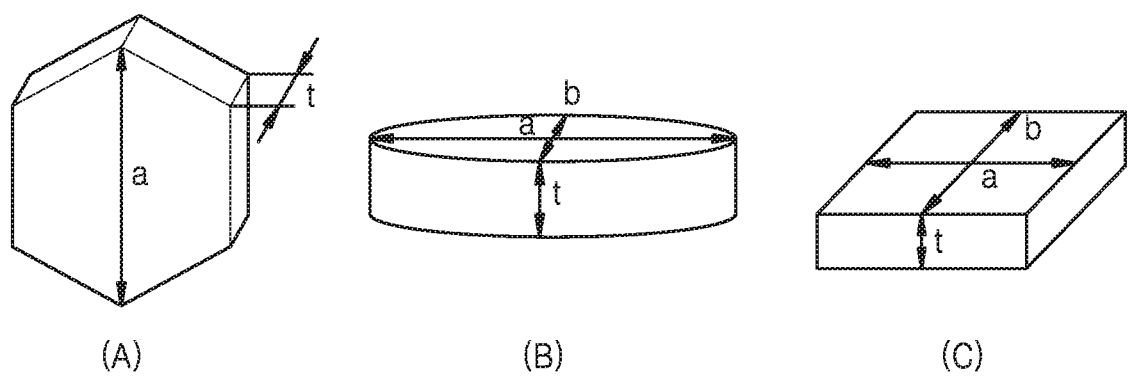
FIG. 2A is a schematic diagram illustrating a nickel-based active precursor having shapes of plate particles according to an embodiment.
Figure 2B:
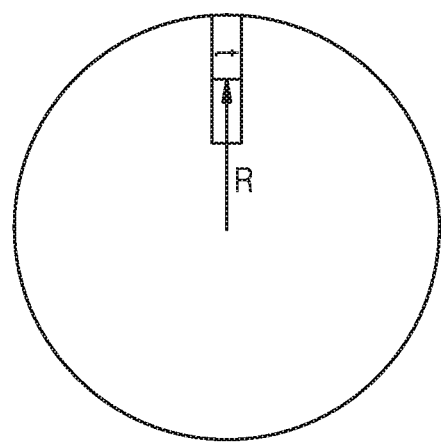
FIG. 2B is a diagram for describing the definition of a radial arrangement in a secondary particle of a nickel-based active material according to an embodiment.

Hereinafter, a nickel-based active precursor according to an embodiment of the present disclosure will be described with reference to FIGS. 1A to 2B. FIG. 1A schematically illustrates a structure of a nickel-based active material precursor according to an embodiment. FIG. 1B is a graph showing changes in amounts of nickel according to a distance from a core in a nickel-based active precursor according to an embodiment. FIG. 2A is a schematic diagram illustrating a nickel-based active precursor having shapes of plate particles according to an embodiment, and FIG. 2B is a diagram for describing the definition of a radial arrangement in a secondary particle of a nickel-based active material according to an embodiment.

AS shown in FIG. 1A, a nickel-based active precursor according to an embodiment has a structure in which a first core 10 which is porous; a second core 11 located on the first core 10 and having a higher density than that of the first core 10; and a shell 12 located on the second core 11 and having a radial arrangement structure, wherein an amount of nickel included in the first core 10 is greater than or equal to that of nickel included in the second core 11, and an amount of nickel included in the second core 11 is greater than that of nickel included in the shell 12. In the nickel-based active precursor according to an embodiment, lithium diffusion is facilitated, and stress caused during charging and discharging is easily absorbed.

Throughout the specification, the terms "first core", "second core", and "shell" of the nickel-based active precursor are defined as follows. The term "core" as used herein refers to an area b of 70% to 99% in length, for example, 80% in length, from the center based on a total length from the center to a surface of a nickel-based precursor compound, or an area other than an area within 2 μm in thickness from the outermost boundary of a nickel-based active material. The term "shell" as used herein refers to an area of 1% to 30% in length, for example, 20% in length, from the center based on a total length from the center to a surface of a nickel-based compound precursor, or an area other than an area within 2 μm in thickness from the outermost boundary of a nickel-based compound precursor. The term "core" refers to a combination of a first core and a second core. The "first core" corresponds to $D_{porous\ core}$ a of FIGS. 1A and 1B, and has a volume of 50% by volume to 80% by volume based on a total volume of the first core and the second core of the nickel-based active precursor. The "second core" refers to a remaining area c. The term "shell" refers to an area d of 1% to 30% in length, for example, 20% in length, from the outermost surface based on a total distance from the center to a surface of a nickel-based compound precursor, or an area within 2 μm in thickness from the outermost boundary of a nickel-based compound precursor Referring to FIG. 1B, in the nickel-based active precursor according to an embodiment, the amount of the nickel included in the first core 10 which is porous may be greater than or equal to that of the nickel included in the second core 11, and the amount of the nickel included in the second core 11 may be greater than that of the nickel included in the shell 12. The amount of the nickel included in the first core 10 which is porous may be equal to that of the nickel included in the second core 11. However, the amount of the nickel included in the shell 12 may decrease compared to that of the nickel respectively included in the first core 10 and the second core 11.

In one embodiment, the first core 10 may have a radius of 3 μm to 6 μm, the second core 11 may have a radius of 4 μm to 7 μm, and the shell 12 may have a thickness of 0.05 μm to 1.8 μm.

The first core 10 may have a porosity of 20% to 50%, the second core 11 may have a porosity of 5% or less, for example, 3% or less, and for example, 1% to 3%, and the shell 12 may have a porosity of 10% or less, for example, 9% or less, and for example, 6% to 9%.

The first core 10 and/or the second core 11 may respectively have an irregular porous structure. The term "irregular porous structure" as used herein refers to a structure including pores with non-uniform or irregular sizes and shapes. In addition, the first core 10, the second core, and/or the shell 12 of the nickel-based active precursor of the present disclosure may respectively have plate particles.

Referring to FIG. 2A, a plate particle may have a polygonal nanoplate shape such as a hexagonal plate shape (A), a nanodisc shape (B), and a rectangular parallelepiped shape (C). The term "plate particle" as used herein refers to a particle having a thickness t smaller than a length of a major axis (in a plane direction) (a). The length of the major axis refers to a maximum length of the widest plane of the plate particle. The plate particles may be aligned in a radial direction, and may have an aspect ratio of 1:3 to 1:20. Here, a crystal plane (i.e., a plane perpendicular to the crystal plane (001) to which lithium can enter and exit) may be exposed to a surface of secondary particles. Referring to FIG. 2B, the term "radial(ly)" as used herein means that a direction of the thickness t of a plate (i.e., a plane (001) direction) may be arranged in a direction perpendicular to or within ±+5 of a direction perpendicular to a direction R toward a center of the secondary particle.

When primary plate particles are radially arranged, the pores exposed on surfaces therebetween may be toward a central direction, thereby facilitating diffusion of lithium from the surface. In one embodiment, the nickel-based active precursor may be a compound represented by Formula 1a in the first core 10 and the second core 11.

$$Ni_{1-x-y-z}Co_xMn_yM_z(OH)_2. \quad \text{[Formula 1a]}$$

In Formula 1a, M may be an element selected from boron gnesium (Mg), calcium (Ca), strontium (Sr), barium (Ba), titanium (Ti), vanadium (V), tungsten (W), chromium (Cr), iron (Fe), copper (Cu), zirconium (Zr), and aluminum (Al), and $0.10 < x \le 0.35$, $0.10 \le y \le 0.35$, $0 \le z \le 0.05$, and $0.5 \le (1-x-y-z) \le 0.80$ are satisfied. The compound represented by Formula 1a may be $Ni_{0.6}Co_{0.2}Mn_{0.2}M_z(OH)_2$, $Ni_{0.66}C_{0.22}Mn_{0.22}M_z(OH)_2$, or the like.

The shell of the nickel-based active precursor may have a composition represented by Formula 1b.

$$Ni_{1-x-y-z}Co_xMn_yM_z(OH)_2 \quad \text{[Formula 1b]}$$

In Formula 1b, M may be an element selected from B, Mg, Ca, Sr, Ba, Ti, V, W, Cr, Fe, Cu, Zr, and Al, and $0.10 < x \le 0.40$, $0.10 \le y \le 0.40$, $0 \le z \le 0.05$, or $0.20 \le (1-x-y-z) \le 0.50$ may be satisfied. The compound represented by Formula 1b may be $Ni_{1/3}Co_{1/3}Mn_{1/3}M_z(OH)_2$ or the like.

In one or more embodiments, the amount of the nickel respectively included in the first core and the second core of the nickel-based active precursor may be, for example, 50 mol % to 95 mol %, for example, 75 mol % to 90 mol %, and the amount of the nickel included in the shell of the nickel-based active precursor may be 20 mol % to 50 mol %, for example, 30 mol % to 35 mol %.

In one or more embodiments, the first core and the second core of the nickel-based active precursor may each include a compound represented by Formula 1c, and the shell of the nickel-based active precursor may include a compound represented by Formula 1b.

$$Ni_{1-x-y-z}Co_xMn_yM_z(OH)_2 \quad \text{[Formula 1c]}$$

In Formula 1c, M may be an element selected from B, Mg, Ca, Sr, Ba, Ti, V, W, Cr, Fe, Cu, Zr, and Al, and $0.03 < x \le 0.20$, $0 \le y \le 0.20$, $0 \le z \le 0.05$, and $0.70 \le (1-x-y-z) \le 0.95$ may be satisfied. The compound represented by Formula 1c may be $Ni_{0.8}Co_{0.1}Mn_{0.1}M_z(OH)_2$ or the like.

The first core may include the compound represented by Formula 1c, and the second core may include a compound represented by Formula 1d.

$$Ni_{1-x-y-z}Co_xMn_yM_z(OH)_2 \quad \text{[Formula 1d]}$$

In Formula 1d, M may be an element selected from B, Mg, Ca, Sr, Ba, Ti, V, W, Cr, Fe, Cu, Zr, and Al, and $0.05 < x \le 0.20$, $0.05 \le y \le 0.20$, $0 \le z \le 0.05$, and $0.60 \le (1-x-y-z) \le 0.8$ may be satisfied.

In one or more embodiments, the nickel-based active precursor may include, for example, a compound represented by Formula 1.

$$N_{1-x-y-z}Co_xMn_yM(OH)_2 \quad \text{[Formula 1]}$$

In Formula 1, M may be an element selected from B, Mg, Ca, Sr, Ba, Ti, V, W, Cr, Fe, Cu, Zr, and Al, and $x \le (1-x-y-z)$, $y \le (1-x-y-z)$, $0 < x < 1$, and $0 \le y < 1$, $0 \le z < 1$ may be satisfied. In Formula 1, $0 < x \le 1/3$, $0 \le y \le 0.5$, $0 \le z \le 0.05$, and $1/3 \le (1-x-y-z) \le 0.95$ may be satisfied. The compound represented by Formula 1 may be, for example, $Ni_{0.6}Co_{0.2}Mn_{0.2}(OH)_2$, $Ni_{0.5}Co_{0.2}Mn_{0.3}(OH)_2$, $Ni_{1/3}Co_{1/3}Mn_{1/3}(OH)_2$, $Ni_{0.8}Co_{0.1}Mn_{0.1}(OH)_2$, or $Ni_{0.85}Co_{0.1}Al_{0.05}(OH)_2$.

The nickel-based active precursor according to an embodiment may have a size of 9 μm to 20 μm, for example, 10 μm to 16 μm. Throughout the specification, the term "size" refers to an average diameter when the nickel-based active precursor is a particle, or a length of a major axis of the nickel-based active precursor when the nickel-based active precursor is not a particle.

Figure 3:
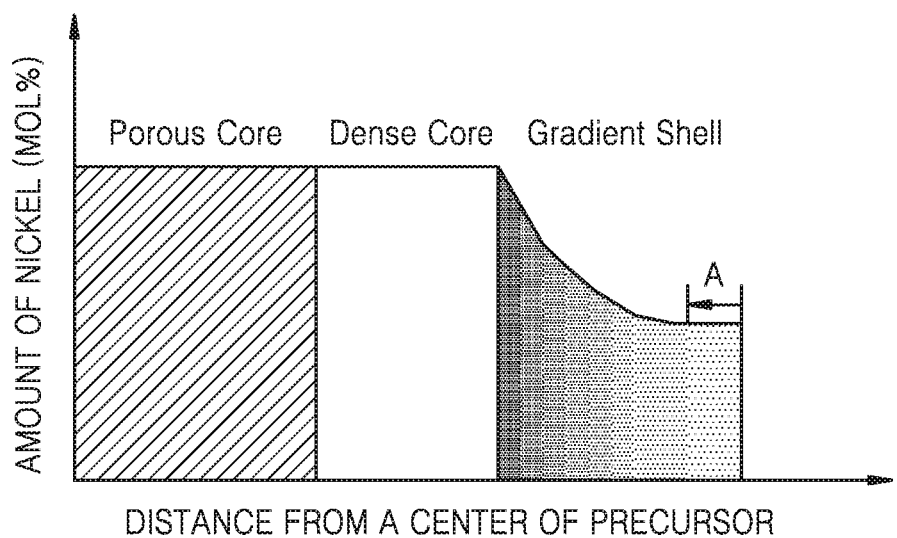
FIG. 3 is a graph showing changes in amounts of nickel according to a distance from a core in a nickel-based active precursor according to another embodiment.

Hereinafter, the nickel-based active precursor according to another embodiment will be described by referring to FIG. 3. FIG. 3 is a graph showing changes in amounts of nickel according to a distance from the core in the nickel-based active precursor according to another embodiment.

The nickel-based active precursor according to another embodiment has substantially the same constituent elements as the nickel-based active precursor according to an embodiment, except that the amount of the nickel included in the shell is different. Hereinafter, the substantially the same constituent elements will not be described in detail, and the amount distribution of the nickel included in the shell will be mainly described.

Referring to FIG. 3, the shell 12 may have a concentration gradient in which an amount of nickel sharply decreased toward a surface portion of the shell 12 from a region adjacent to the second core 11. In addition, the amount of the nickel included in the surface portion of the shell 12 may be controlled to be smaller than that of the nickel respectively included in the first core and the second core. In addition, the shell 12 may include a region having a concentration gradient and a region not having a concentration gradient. A volume ratio of a combination of the first core 10 and the second core 11 to a region having a concentration gradient in the shell 12 may be 1:0.9 to 1:1.1, and a volume ratio of a combination of the first core 10 and the second core 11 to a region not having a concentration gradient in the shell 12 may be 1:0.05 or less, for example, 1:0.01 to 1:0.05.

Figure 4:
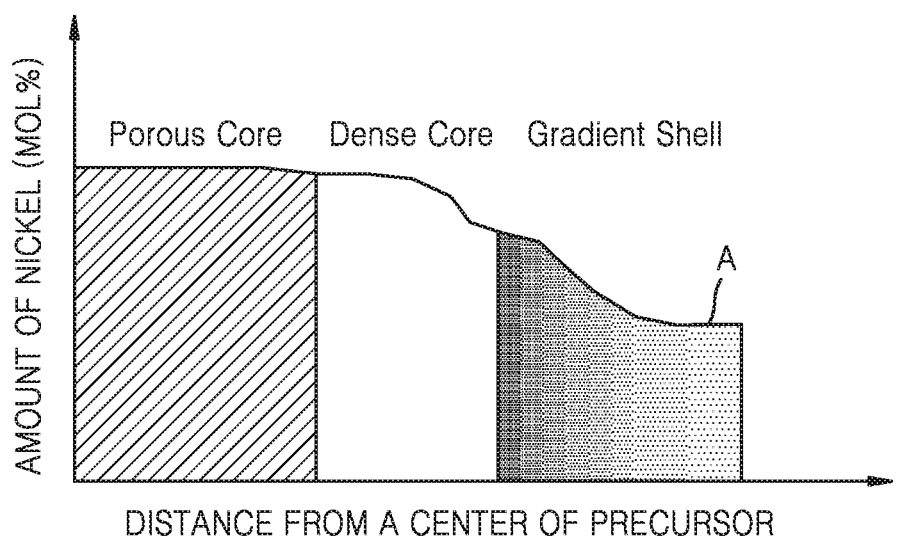
FIG. 4 is a graph showing changes in amounts of nickel according to a distance from a core in a nickel-based active precursor according to another embodiment.

Hereinafter, the nickel-based active precursor according to another embodiment will be described by referring to FIG. 4. FIG. 4 is a graph showing changes in amounts of nickel according to a distance from from the core in the nickel-based active precursor according to another embodiment.

The nickel-based active precursor according to another embodiment has substantially the same constituent elements as the nickel-based active precursor according to an embodiment, except that the amount of the nickel respectively included in the second core 11 and the shell 12 is different. Hereinafter, the substantially the same constituent elements will not be described in detail, and the amount distribution of the nickel respectively included in the second core and the shell is different.

Referring to FIG. 4, the nickel included in the nickel-based active precursor may have a concentration gradient from a region adjacent to the porous first core 10 toward the shell 12 in the second core 11. As shown in FIG. 4, the amount of the nickel may gradually decrease from an area of the second core 11 adjacent to first core 10 to an area of the second core 11 adjacent to the shell 12 or a surface portion of the shell 12. In addition, the amount of the nickel included in the shell 12 may gradually decrease from an area adjacent to the second core 11 to a surface portion of the shell 12.

Hereinafter, a method of producing a nickel-based active material precursor according to an embodiment will be described. To produce a nickel-based active precursor, a first process of forming a first core which is porous is prepared first. Next, a second process of forming a second core located on the first core and having a higher density than that of the first core is performed. In addition, a third process of forming a shell located on the second core and having improved orientation is performed.

The shell may be located on the second core and have a radial arrangement structure. An amount of nickel included in the first core may be greater than that of nickel included in the second core, and an amount of nickel included in the second core may be greater than that of nickel included in the shell.

[Absence of Concentration Gradient of Nickel in Shell]

Stirring powers of the first process, the second process, and the third process may gradually decrease reduced in the order of the first process, the second process, and the third process. In addition, a reaction mixture in each process may have a pH of 10 to 12, and a nickel raw material may be supplied in the third process at a speed that is decreased compared with a speed at which a nickel raw material is supplied respectively in the first process and the second process. In addition, by changing a composition of a metal raw material supplied in the third process, a composition of the shell may be different from that of the core. In addition, by changing a composition of a metal raw material supplied in the third process, a concentration of a complexing agent may be maintained at a higher level than that of a complexing agent used respectively in the first process and the second process.

[Presence of Concentration Gradient of Nickel in Shell]

Stirring powers and the concentration of the complexing agents in the first process, the second process, and the third process may gradually decreased in the order of the first process, the second process, and the third process. In addition, a reaction mixture in each process may have a pH maintained in a range of 10 to 12, or the pH of a reaction mixture in the third process may be reduced by 0.4 to 0.6 compared with that of a reaction mixture in the first process or the second process. In addition, the speed at which a metal raw material is supplied in the second process may be increased compared with the speed at which a metal raw material is supplied in the first process while the speed at which a metal raw material is supplied in the third process may be equal to or reduced compared with the speed at which a metal raw material is supplied in the second process. In addition, by changing a composition of a metal raw material supplied in the third process, a composition of the shell may be different from that of the core so that a growth rate is decreased and a reaction may occur under conditions where a concentration of a reactant is diluted to about 50%.

In the first process, the second process, and the third process, the temperature at which reactions proceed may be 40° C. to 60° C., the stirring power may be 0.5 kW/m$^3$ to 6.0 kW/m$^3$, and the pH may be 10 to 12. In addition, the concentration of a complexing agent may be 0.1 M to 1.4 M.

The nickel-based active precursor may be prepared to have good structural stability by appropriately maintaining pores formed by crystal planes (001) while minimizing exposure of the crystal planes (001). In addition, the center of the nickel-based active precursor may have a radial arrangement structure, and the length of lithium diffusion may be efficiently controlled by this structure.

In the first process, the pH of a mixture of a complexing agent, a pH regulator, and a metal raw material forming a nickel-based active material precursor is controlled and reacted to form a first core which is porous.

In the nickel-based active precursor according to an embodiment, the structure of the first core which is porous may be influenced by the amount of the metal raw material, the concentration of the complexing agent, and the pH of the reaction mixture.

The pH regulator serves to form a precipitate from the reaction mixture by adjusting the pH of the reaction mixture. Examples of the pH regulator are ammonium hydroxide, sodium hydroxide (NaOH), sodium carbonate (Na$_2$CO$_3$), and sodium oxalate (Na$_2$C$_2$O$_4$). As the pH regulator, for example, sodium hydroxide (NaOH) may be used.

The complexing agent serves to adjust a reaction rate of forming a precipitate in coprecipitation reaction, and may be ammonium hydroxide (NH$_4$OH) (ammonia water), citric acid, and the like. The complexing agent may be used in any amount commonly used in the art. As the complexing agent, for example, ammonia water may be used.

In each process, the concentration of the complexing agent may be 0.1 M to 1.5 M, for example, about 0.5 M to about 1.4 M.

In the first process, the speed at which the metal raw material is supplied for the formation of the first core may be 6 L/hr to 9 L/hr, and the speed at which the complexing agent is supplied may be 1 L/hr to 5 L/hr.

Next, a metal raw material and a complexing agent are further added to the reaction product of the first process, and the pH of the reaction mixture is controlled and reacted to carry out the second process of forming a second core.

In the second process, the concentration of the complexing agent may be 0.1 M to 1.5 M as described above. In one embodiment, the concentration of the complexing agent in the second process may be equal to or reduced compared with that of the complexing agent in the first process. When the amount of the nickel included in the core is high, it is advantageous to gradually reduce the high amount of the complexing agent in consideration of the formation of a porous layer in the center.

In the second process, the speed at which the metal raw material is supplied for the formation of the second core may be 6 L/hr to 11 L/hr, and the speed at which the complexing agent is supplied may be 1 L/hr to 5 L/hr.

When there is no concentration gradient in the reactant in the second process and a difference in the amounts of the nickel between the core and the shell is 10% or less, the third process may proceed by reducing the speed at which the metal raw material is supplied and increasing the concentration of the complexing agent. However, when the difference in the amounts of the nickel between the core and the shell is 10% or greater, the third process may proceed by diluting the reactant by about 50% due to a difference in the growth rate that is dependent upon the amounts of the nickel. Here, the pH of a reaction mixture in the third process may be reduced by 0.4 to 0.6 compared with that of a reaction mixture in the second process, or the speed at which the metal raw material is supplied may be reduced. The metal raw material may be supplied as the amount of the nickel changes with a slope from the value of the core to the value of the shell.

Therefore, the reaction conditions of the third process may have a great effect on the surface depth of the porous layer in the nickel-based active precursor.

The speed at which the metal raw material is supplied in the third process may be 6 L/hr to 11 L/hr, and the speed at which the complexing agent is supplied in the third process may be 1 L/hr to 5 L/hr.

The pH of the reaction mixture in the first process, the second process, and the third process may be adjusted within a range of 10 to 12, and the pH of the reaction mixture in each process may be adjusted same.

In the preparation process, as the metal raw material, a metal raw material in consideration of the composition of the nickel-based active material precursor may be used. The metal raw material may be metal carbonate, metal sulfate, metal nitrate, metal chloride, and the like.

To prepare the compound represented by Formula 1, a manganese precursor, a nickel precursor, and a cobalt precursor may be used as the metal raw material.

Hereinafter, a method of producing a nickel-based active material by using the nickel-based active precursor according to an embodiment will be described.

A lithium precursor and the nickel-based active material precursor according to an embodiment are mixed in a predetermined molar ratio, and then, subjected to a low-temperature heat treatment at 600° C. to 800° C. to prepare a nickel-based active material.

The lithium precursor may be, for example lithium hydroxide, lithium fluoride, lithium carbonate, or any mixture thereof. A mixing ratio of the lithium precursor and the metal hydroxide may be adjusted stoichiometrically to prepare a metal hydroxide represented by Formula 2.

The mixing may be performed by dry mixing or by using a mixer.

The low-temperature heat treatment may be performed in an oxidizing gas atmosphere. The oxidizing gas atmosphere may be performed using an oxidizing gas such as oxygen or air, and the oxidizing gas may include, for example, 10 vol % to 20 vol % of oxygen or air and 80 vol % to 90 vol % of an inert gas.

The heat treatment may be performed at a temperature where reactions of the lithium precursor and the metal hydroxide proceed, and a temperature of a densification temperature or less than a densification temperature. In this regard, the densification temperature refers to a temperature at which crystallization is sufficiently performed to realize a charge capacity obtained by an active material.

The heat treatment may be performed, for example, at 650° C. to 800° C., for example, at 700° C. to 800° C. A heat treatment time may vary according to the temperature of the low-temperature heat treatment, or the like, but may be, for example, from 3 to 10 hours.

When the heat treatment is performed under the above-described conditions, primary particles of a nickel-based active material including a shell having a radial arrangement structure and a core having a irregular porous structure may be prepared. An average particle diameter of the primary particles of the nickel-based active material may be in a range of 100 nm to 250 nm in a shorter axis direction. Due to such an average particle diameter, stress caused by volume changes during charging and discharging may be suppressed.

The primary particles of the nickel-based active material may be subjected to a high-temperature heat treatment in an oxidizing gas atmosphere while inhibiting the gases from being exhausted. By inhibiting the gases from being exhausted in the preparation of secondary particles of the nickel-based active material, the atmosphere inside the reactor may be maintained as much as possible, and thus generation of a resistive layer may be inhibited and particle densification may be performed.

The high-temperature heat treatment may be performed, for example, at 850° C. to 900° C. A high-temperature heat treatment time may vary according to the temperature of the high-temperature heat treatment, and the like, but may be, for example, in a range of 3 to 10 hours.

An average particle diameter of the secondary particles of the nickel-based active material according to an embodiment may be 2 μm to 18 μm, for example, 3 μm to 12 μm.

In the high-temperature heat treatment of the primary particles of the nickel-based active material, a compound including at least one selected from Ti, Zr, and Al may be further added thereto.

The compound including at least one selected from Ti, Zr, and Al may be, for example, titanium oxide, zirconium oxide, aluminum oxide, and the like.

An amount of the compound including at least one selected from Ti, Zr, and Al may be 0.0005 parts by weight to 0.01 parts by weight based on 100 parts by weight of the secondary particles of the nickel-based material.

The existence and distribution of the compound including at least one selected from Ti, Zr, and Al may be identified by Electron Probe Micro-Analysis (EPMA).

The nickel-based active material obtained from the nickel-based active precursor according to an embodiment may include, a compound represented by Formula 2.

$$Li_a(Ni_{1-x-y-z}Co_xMn_yM_z)O_2 \quad \text{[Formula 2]}$$

In Formula 2, M may be an element selected from B, Mg, Ca, Sr, Ba, Ti, V, W, Cr, Fe, Cu, Zr, and Al, $1.0 \leq a \leq 1.3$, $x \leq (1-x-y-z)$, $y \leq (1-x-y-z)$, $0 < x < 1$, and $0 \leq y < 1$, $0 \leq z < 1$ may be satisfied.

In Formula 2, $1.0 \leq a \leq 1.3$, $0 < x \leq \frac{1}{3}$, $0 \leq y \leq 0.5$, $0 \leq z \leq 0.05$, and $\frac{1}{3} \leq (1-x-y-z) \leq 0.95$ may be satisfied.

In Formula 2, a may be, for example, 1 to 1.1, x may be 0.1 to 0.3, and y may be 0.05 to 0.3. In one embodiment, z in Formula 2 may be 0.

In one or more embodiments, when z in Formula 2 satisfies $0 < z \leq 0.005$, M may be Al.

In the nickel-based active material, the amount of nickel may be greater than each of the other transition metals based on 1 mole in total of transition metals. By using the nickel-based active material having such a high nickel amount, lithium diffusivity increases, conductivity increases, and higher capacity may be obtained at the same voltage in a lithium secondary battery including a cathode containing the nickel-based active material. However, lifespan characteristics may deteriorate due to occurrence of cracks described above.

The nickel-based active material may be $LiNi_{0.6}Co_{0.2}Mn_{0.2}O_2$, $LiNi_{0.5}Co_{0.2}Mn_{0.3}O_2$, $LiNi_{1/3}Co_{1/3}Mn_{1/3}O_2$, $LiNi_{0.8}Co_{0.1}Mn_{0.1}O_2$, or $LiNi_{0.85}Co_{0.1}Al_{0.05}O_2$.

In the nickel-based active material, the amount of nickel may be greater than that of manganese and that of cobalt, respectively.

The primary particles of the nickel-based active material may have a size of 2 μm to 5 μm, and the secondary particles of the nickel-based active material may have a size of 5 μm to 25 μm. When the sizes of the primary particles and the secondary particles in the nickel-based active material are within the ranges above, lithium ions may easily be used.

The shell of the nickel-based active material may have, for example, a structure in which plate particles are aligned in a radial arrangement. In addition, two or more active materials constituted the radial center. The plate particles may have an aspect ratio of 1:3 to 1:20, for example, 1:5 to 1:15.

Hereinafter, a method of manufacturing a lithium secondary battery including the nickel-based active material according to an embodiment, a cathode, an anode, a lithium salt-containing non-aqueous electrolyte, and a separator will be described.

The cathode and the anode may each be prepared by coating a comp cathode active layer-forming composition an anode active material layer-forming composition on current collectors and drying the coated compositions, respectively.

The cathode active material layer-forming composition may be prepared by mixing a cathode active material, a conductive agent, a binder, and a solvent, and the cathode active material according to an embodiment may be used as the cathode active material.

The binder, as a component assisting binding of the active material to the conductive agent and to the current collector, may be added thereto in an amount of 1 parts by weight to 50 arts by weight based on 100 parts by weight of the total weight of the cathode active material. Examples of the binder may include, but are not limited thereto, polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene-butadiene rubber, fluoride rubber, and various copolymers. An amount of the binder may be in a range of 2 parts by weight to 5 parts by weight based on 100 parts by weight of the total weight of the cathode active material. When the amount of the binder is within the range above, a high binding force of the active material to the current collector may be obtained.

The conductive agent may be any material that does not cause any chemical change in a battery and has conductivity, without limitation. For example, the conductive agent may be: graphite such as natural graphite and artificial graphite; a carbonaceous material such as carbon black, acetylene black, ketjen black, channel black, furnace black, lamp black, and thermal black; conductive fiber such as carbon fiber and metal fiber; carbon fluoride; metal powder such as aluminum powder and nickel powder conductive whisker such as zinc oxide and potassium titanate; conductive metal oxide such as titanium oxide; and conductive materials such as polyphenylene derivatives.

An amount of the conductive agent may be in a range of 2 parts by weight to 5 parts by weight based on 100 parts by weight of the total weight of the cathode active material. When the amount of the conductive agent is within the range above, a finally obtained electrode may have excellent conductivity.

Examples of the solvent may include, but are not limited to, N-methylpyrrolidone.

An amount of the solvent may be in a range of parts by weight 1 to 10 parts by weight based on 100 parts by weight of the cathode active material. When the amount of the solvent is within the range above, a process of forming the active material layer may efficiently be performed.

The cathode current collector may be any material having a thickness 3 μm to 500 μm and high conductivity and not causing any chemical change in a battery without limitation. Examples of the cathode current collector may include stainless steel, aluminum, nickel, titanium, heat-treated carbon, or aluminum or stainless-steel surface-treated with carbon, nickel, titanium, silver, or the like. The current collector may have a surface on which irregularities are formed to enhance adhesive force of the cathode active material and may be used in any of various forms including films, sheets, foils, nets, porous structures, foams, and non-woven fabrics.

Separately, an anode active material, a binder, a conductive agent, and a solvent are mixed to prepare an anode active material layer-forming composition.

Examples of the anode active material include, but are not limited to, a carbonaceous material such as graphite and carbon, lithium metal, an alloy thereof, and a silicon oxide-based material. In one embodiment, silicon oxide may be used.

The binder may be added thereto in an amount of 1 parts by weight to 50 parts by weight based on 100 parts by weight of the total weight of the anode active material. The binder may be the same type as that of the cathode, without limitation.

The conductive agent may be used in an amount of 1 parts by weight to about 5 parts by weight based on 100 parts by weight of the total weight of the anode active material. When the amount of the conductive agent is within this range, a finally obtained electrode may have excellent conductivity.

The solvent may be used in an amount of 1 parts by weight to 10 parts by weight based on 100 parts by weight of the total weight of the anode active material. When the amount of the solvent is within this range, a process of forming an anode active material layer may be easily performed.

The conductive agent and the solvent may be the same types as those used in preparing the cathode.

The anode current collector may be generally formed to have a thickness of 3 μm to 500 μm. The anode current collector may be any conductive material not causing any chemical change in a battery without limitation. Examples of the anode current collector may include, but are not limited to, copper, stainless steel, aluminum, nickel, titanium, heat-treated carbon, copper or stainless-steel surface-treated with carbon, nickel, titanium, silver, or the like, or an aluminum-cadmium alloy. In addition, like the cathode current collector, the anode current collector may have a surface on which irregularities are formed to enhance adhesive force of the anode active material and may be used in any of various forms including films, sheets, foils, nets, porous structures, foams, and non-woven fabrics.

The separator may be interposed between the cathode and the anode each prepared according to the above-described process.

The separator may have a pore diameter of 0.01 μm to 10 μm and a thickness of 5 μm to 300 μm. Particularly, examples of the separator may include: an olefin-based polymer such as polypropylene and polyethylene; or a sheet or non-woven fabric formed of glass fibers. When a solid electrolyte such as a polymer is used as the electrolyte, the solid electrolyte may also serve as a separator.

The lithium salt-containing non-aqueous electrolyte may be formed of a non-aqueous electrolytic solution and lithium. A non-aqueous electrolyte may be a non-aqueous electrolytic solution, an organic solid electrolyte, an inorganic electrolyte, and the like.

Examples of the non-aqueous electrolytic solution may include, but are not limited to, any aprotic organic solvent, such as N N-methyl pyrrolidinone, propylene carbonate, ethylene carbonate, butylene carbonate, dimethyl carbonate, diethyl carbonate, gamma-butyro lactone, 1,2-dimethoxy ethane, 2-methyl tetrahydrofuran, dimethylsulfoxide, 1,3-dioxolane, N,N-formamide, N,N-dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte may include, but are not limited to, polyethylene derivatives, polyethylene oxide derivatives, polypropylene oxide derivatives, phosphoric acid ester polymers, polyester sulfide, polyvinyl alcohol, and polyvinylidene fluoride.

Examples of the inorganic solid electrolyte may include, but are not limited to, nitrides, such as $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$, halides, and sulfates.

The lithium salt may be a material easily dissolved in the non-aqueous electrolyte. Examples of the lithium salt may include, but are not limited thereto, LiCl, LiBr, LiI, LiClO$_4$, LiBF$_4$, LiB$_{10}$Cl$_{10}$, LiPFe, LiCF$_3$SO$_3$, LiCF$_3$CO$_2$, LiAsFe, LiSbFe, LiAlCl$_4$, CH$_3$SO$_3$Li, (CF$_3$SO$_2$)$_2$NLi, (FSO$_2$)$_2$NLi, lithium chloroborate, lower aliphatic lithium carboxylate, and lithium tetraphenyl borate.

Figure 5:
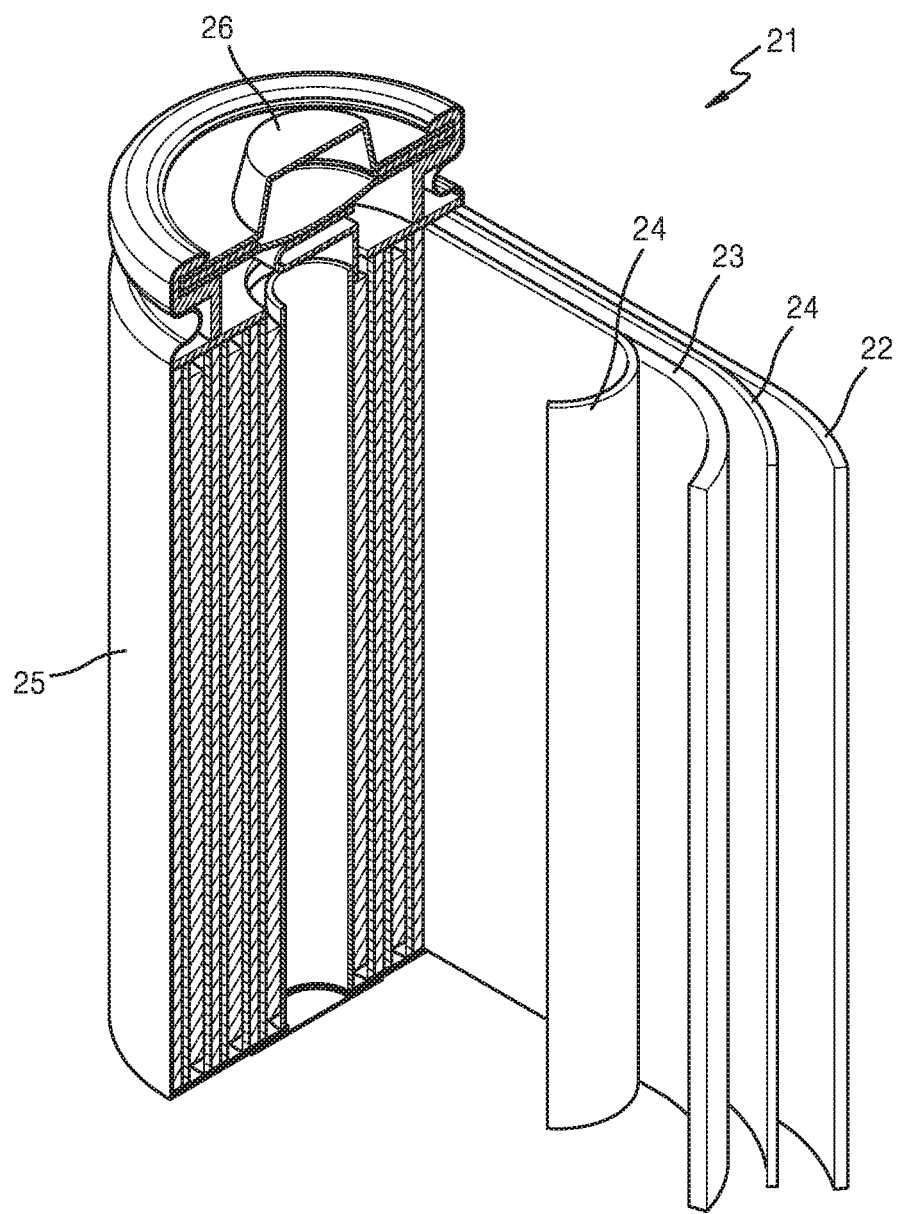
FIG. 5 schematically illustrates a structure of a lithium secondary battery according to an embodiment.

FIG. 5 is a cross-sectional view schematically illustrating a representative structure of a lithium secondary battery according to an embodiment.

Referring to FIG. 5, a lithium secondary battery 21 includes a cathode 23, an anode 22, and a separator 24. The cathode 23, the anode 22, and the separator 24 are wound or folded, and then, accommodated in a battery case 25. Subsequently, an organic electrolyte is injected into the battery case 25, and the battery case 25 is sealed with a cap assembly 26, thereby completing the manufacture of the lithium secondary battery 21. The battery case 25 may have a cylindrical, rectangular, or thin-film shape. For example, the lithium secondary battery 21 may be a large-sized thin-film battery. The lithium secondary battery may be a lithium ion battery. The separator may be interposed between the cathode and the anode to form a battery assembly. After the battery assembly is stacked in a bi-cell structure and impregnated with the organic electrolyte, the obtained resultant may be accommodated in a pouch, thereby completing the manufacture of a lithium ion polymer battery. In addition, a plurality of battery assemblies may be stacked to form a battery pack, which may be used in any device that requires high capacity and high output. For example, the battery pack may be used in notebook computers, smart phones, and electric vehicles.

Also, the lithium secondary battery may be used in electric vehicles (EVs) due to excellent storage stability at high temperature, lifespan characteristics, and high-rate characteristics. For example, the lithium secondary battery may be used in hybrid vehicles such as plug-in hybrid electric vehicles (PHEVs).

Hereinafter, the present disclosure will be described in more detail with reference to the following examples and comparative examples. However, the following examples and comparative examples are merely presented to exemplify the present disclosure, and the scope of the present disclosure is not limited thereto.

Example 1: Manufacture of Nickel-Based Active Precursor and Nickel-Based Active Material A nickel-based active material precursor and a nickel-based active material were synthesized according to a co-precipitation method described below. As a metal raw material forming the nickel-based active precursor in the following manufacturing process, nickel sulfate (NiSO$_4$.6H$_2$O), cobalt sulfate (CoSO$_4$.7H$_2$O), and manganese sulfate (MnSO$_4$.H$_2$O) were used.

[Step 1: 321 rpm, 0.60 M of NH$_3$, and pH of 10.0 to 11.0]

First, ammonia water having a concentration of 0.6 mol/L was added to a reactor. Reaction was initiated at a stirring rate of 350 rpm and at a reaction temperature of 50° C., and then, and a metal raw material and ammonia water were added to the reactor at respective speeds of 8 L/hr and 1.5 L/hr. Sequentially, NaOH was added to the reactor so that the pH of the reactor was controlled to be maintained within a range of 10.0 to 11.0, and the reaction was continued for 6 hours.

[Step 2: 280 rpm, 0.60 M of NH$_3$, and pH of 10.0 to 11.0]

Following the reaction, the stirring rate in the reactor was reduced to 300 rpm, and a metal raw material and ammonia water were added to the reactor at respective speeds of 8 L/hr and 1.5 L/hr. Here, the pH of the reactor was controlled to be maintained in a range of 10.0 to 11.0, and the reaction was continued for 6 hours.

[Step 3: 223 rpm, 0.70 M of NH$_3$, and pH of 10.0 to 11.0]

The stirring rate in the reactor was reduced to 250 rpm, and a metal raw material and ammonia water were added to the reactor at respective speeds of 6.0 L/hr and 1.5 L/hr. Here, the metal raw material was supplied such that a composition of the total precursors had a molar ratio of 6:2:2 (Ni:Co:Mn). The reaction was continued for 3 hours, and then, the resultant reaction product was washed using distilled water and dried in a hot-air dryer at about 150° C. for 24 hours to obtain a nickel-based active material precursor.

Next, lithium hydroxide (LiOH) was added to the nickel-based active precursor such that LiOH and the nickel-based active precursor were mixed in a molar ratio of 1:1. The mixture was then heat-treated under the following conditions.

To perform a heat treatment, a temperature raised in an air atmosphere up to about 880° C. for 350 minutes, and then, a heat treatment was performed at 880° C. for 7 hours and 30 minutes. The resultant product was naturally cooled to obtain a nickel-based active material.

Example 2: Manufacture of Nickel-Based Active Precursor and Nickel-Based Active Material A nickel-based active material precursor and a nickel-based active material were synthesized according to a co-precipitation method described below. As a metal raw material forming the nickel-based active precursor in the following manufacturing process, nickel sulfate (NiSO$_4$.6H$_2$O), cobalt sulfate (CoSO$_4$.7H$_2$O), and manganese sulfate (MnSO$_4$.H$_2$O) were used.

[Step 1: 300 rpm, 1.40 M of NH$_3$, and pH of 10.0 to 11.0]

First, ammonia water having a concentration of 1.4 mol/L was added to a reactor. Reaction was initiated at a stirring rate of 300 rpm and at a reaction temperature of 50° C., and then, and a metal raw material and ammonia water were added to the reactor at respective speeds of 8 L/hr and 4.0 L/hr. At the same time, NaOH which was used as a pH adjustor was added thereto to maintain the pH of the reactor. Here, the pH of the reactor was controlled to be maintained within a range of 10.0 to 11.0, and the reaction was continued for 6 hours.

[Step 2: 250 rpm, 1.20 M of NH$_3$, and pH of 10.0 to 11.0]

The stirring rate in the reactor was reduced to 250 rpm, and a metal raw material and ammonia water were added to the reactor at respective speeds of 11 L/hr and 1.0 L/hr. Here, the pH of the reactor was controlled to be maintained within a range of 10.0 to 11.0, and the reaction was continued for 8 hours. Afterwards, the product obtained in the second process was partially removed from the reactor.

[Step 3: 200 rpm, 0.70 M of NH$_3$, and pH of 10.0 to 11.0]

The stirring rate in the reactor was adjusted to 200 rpm so that the temperature of the diluted resultant reaction product reached 50° C. When the temperature of the reaction reached 50° C., a metal raw material and ammonia water were added to the reactor at respective speeds of 6.0 L/hr and 1.5 L/hr. Here, the pH of the reactor was controlled to be maintained in a range of 10.0 to 11.0, and the reaction was continued for 3.5 hours. The resultant reaction product was washed using distilled water and dried in a hot-air dryer at about 150° C.

for 24 hours to obtain a nickel-based active material precursor. Here, the metal raw material was supplied such that a final resultant product had a molar ratio of 6:2:2 (Ni:Co:Mn).

The nickel-based active precursor and lithium hydroxide were mixed in a molar ratio of 1:1, and the mixture was then heat-treated under the following conditions.

To perform a heat treatment, a temperature raised in an air atmosphere up to about 880° C. for 350 minutes, and then, a heat treatment was performed at 880° C. for 7 hours and 30 minutes. The resultant product was naturally cooled to obtain a nickel-based active material.

Example 3: Manufacture of Nickel-Based Active Precursor and Nickel-Based Active Material A nickel-based active material precursor was synthesized according to a co-precipitation method described below. As a metal raw material forming the nickel-based active precursor in the following manufacturing process, nickel sulfate, cobalt sulfate, and manganese sulfate were used.

[Step 1: 350 rpm, 0.6 0M of $NH_3$, and pH of 10.0 to 11.0]

First, ammonia water having a concentration of 0.6 mol/L was added to a reactor. Reaction was initiated at a stirring rate of 350 rpm and at a reaction temperature of 50° C., and then, and a metal raw material and ammonia water were added to the reactor at respective speeds of 8 L/hr and 4.0 L/hr. At the same time, NaOH was added thereto to control the pH of the reactor to be maintained within a range of 10.0 and 11.0, and the reaction was continued for 6 hours.

[Step 2: 250 rpm, 1.20 M of $NH_3$, and pH of 10.0 to 11.0]

The stirring rate in the reactor was reduced to 250 rpm, and a metal raw material and ammonia water were added to the reactor at respective speeds of 10 L/hr and 4.0 L/hr. Here, the pH of the reactor was controlled to be maintained within a range of 10.0 to 11.0, and the reaction was continued for 13 hours. Afterwards, the product obtained in the second process was partially removed from the reactor.

[Step 3: 200 rpm, 0.70 M of $NH_3$, and pH 1 of 10.5 to 11.5]

The stirring rate in the reactor was adjusted to 200 rpm so that the temperature of the diluted reaction resultant reached 50° C. When the temperature of the reaction reached 50° C., a metal raw material and ammonia water were added to the reactor at respective speeds of 10 L/hr and 2.5 L/hr. Here, the pH of the reactor was controlled to be maintained in a range of 10.5 to 11.5, and the reaction was continued for 14 hours in total. The resultant reaction product was washed using distilled water and dried in a hot-air dryer at about 150° C. for 24 hours to obtain a nickel-based active material precursor. Here, the metal raw material was supplied such that a final resultant product had a molar ratio of 6:2:2 (Ni:Co:Mn).

The nickel-based active precursor and lithium hydroxide were mixed in a molar ratio of 1:1, and the mixture was then heat-treated under the following conditions.

To perform a heat treatment, a temperature raised in an air atmosphere up to about 880° C. for 350 minutes, and then, a heat treatment was performed at 880° C. for 7 hours and 30 minutes. The resultant product was naturally cooled, and consequently, a nickel-based active precursor and a nickel-based active material were manufactured. The nickel-based active precursor includes a first core which is irregularly porous, a second core located on the first core and having a higher density than that of the first core, and a shell located on the second core and having a radial arrangement structure.

Example 4: Manufacture of Nickel-Based Active Precursor and Nickel-Based Active Material A nickel-based active precursor and a nickel-based active material were manufactured in the same manner as in Example 1, except that, when a mixture of LiOH and a precursor mixed in a molar ratio of 1:1 was heat-treated, the heat treatment was performed in a dry-air atmosphere until the temperature reached 800° C. for 6 hours, a second heat treatment was performed in an oxygen atmosphere at 880° C. for 6 hours, and the resultant product was naturally cooled.

Example 5: Manufacture of Nickel-Based Active Precursor and Nickel-Based Active Material A nickel-based active precursor and a nickel-based active material were manufactured in the same manner as in Example 2, except that, when a mixture of LiOH and a precursor mixed in a molar ratio of 1:1 was heat-treated during the manufacture of the nickel-based active material, the heat treatment was performed in a dry-air atmosphere until the temperature reached 800° C. for 6 hours, a second heat treatment was performed in an oxygen atmosphere at 880° C. for 6 hours, and the resultant product was naturally cooled.

Example 6: Manufacture of Nickel-Based Active Precursor and Nickel-Based Active Material [Core (80:10:10)+Gradient Shell (1:1:1)]

A nickel-based active precursor and a nickel-based active material were manufactured in the same manner as in Example 3, except that, when a mixture of LiOH and a precursor mixed in a molar ratio of 1:1 was heat-treated, the heat treatment was performed in a dry-air atmosphere until the temperature reached 800° C. for 6 hours, a second heat treatment was performed in an oxygen atmosphere at 880° C. for 6 hours, and the resultant product was naturally cooled.

Comparative Example 1: Manufacture of Nickel-Based Active Precursor and Nickel-Based Active Material

[Step 1]

[250 rpm, 0.50 M of $NH_3$, and pH of 11.40 to 11.60]

Ammonia water having a concentration of 0.50 mol/L was added to a reactor, and a reaction was initiated at a stirring rate of 250 rpm and at a reaction temperature of 50° C. Then, a metal raw material and ammonia water were simultaneously added to the reactor at respective speeds of 6.00 L/hr and 1.5 L/hr, and NaOH was added thereto to maintain the pH of the reactor. After the reaction was continued for 33 hours, the overflowed resultant reaction product was collected when the reaction was back to a normal state. Then, the synthesized precursor was washed using a filter press. The washed resultant product dried in a hot-air dryer at 150° C. for 24 hours to obtain a nickel-based active material precursor.

The nickel-based active precursor and lithium hydroxide were mixed in a molar ratio of 1:1.

The temperature of the mixture was raised to 880° C. for 350 minutes in an air atmosphere, and then, the mixture was heat-treated at 880° C. for 7 hours and 30 minutes, and the resultant product was naturally cooled to obtain a nickel-based active material.

Comparative Example 2: Manufacture of Nickel-Based Active Precursor and Nickel-Based Active Material A nickel-based active precursor and a nickel-based active material produced therefrom were manufactured in the same manner as in Example 1, except that the stirring powers in the first process, the second process, and the third process were respectively 1.0 kW/m$^3$, 2.0 kW/m$^3$, and 3.0 kW/m$^3$, and that the stirring powers were gradually increased toward the first process, the second process, and the third process.

However, when the manufacture was carried out according to Comparative Example 2, it was difficult to obtain a nickel-based active precursor including a first core which is porous, a second core, and a shell according to an aspect of the present disclosure.

Manufacture Example 1: Coin Half-Cell

A coin half-cell was prepared according to the following method by using secondary particles of the nickel-based active material obtained according to Example 1 as a cathode active material.

96 g of the secondary particles of the nickel-based active material obtained according to Example 1, 2 g of polyvinylidene fluoride, 47 g of N-methyl pyrrolidone as a solvent, and 2 g of carbon black as a conductive agent were mixed using a mixer while removing air bubbles therefrom to prepare a slurry for forming a uniformly dispersed cathode active material layer.

The slurry prepared according to the process above was coated on an aluminum foil by using a doctor blade to form a thin electrode plate. The electrode plate was dried at 135° C. for 3 hours or more, followed by rolling and vacuum drying to prepare a cathode.

A 2032 type coin half-cell was prepared by using the cathode and a lithium metal as a counter electrode. A separator (thickness: about 16 μm) formed of a porous polyethylene (PE) film was interposed between the cathode and the lithium metal counter electrode and an electrolyte was injected thereinto, thereby preparing a 2032 type coin half-cell. Here, 1.1 M of a LiPF$_6$ solution prepared by dissolving LiPF$_8$ in a mixed solvent including ethylene carbonate (EC) and ethylmethyl carbonate (EMC) in a volume ratio of 3:5 was used as the electrolyte.

Preparation Examples 2 to 6: Manufacture of Coin Half-Cells

Coin half-cells were prepared in the same manner as in Manufacture Example1, except that the nickel-based active materials respectively prepared according to Examples 2 to 6 were used instead of the nickel-based active material prepared according to Example 1.

Comparative Manufacture Example 1: Manufacture of Coin-Half Cell

Lithium secondary batteries were prepared in the same manner as in Manufacture Example1, except that the nickel-based active material prepared according to Comparative Example 1 was used instead of the nickel-based active material prepared according to Example 1.

Evaluation Example 1: Particle Size Analysis

In the nickel-based active precursors prepared according to Examples 1 to 6, compositions of each of the core and the shell, average compositions of the nickel-based active precursor, the radius of the first core (r1), the radius of the second core (r2), the thickness of the shell (t1) were measured, and the results are shown in Table 1 below:

TABLE 1

| | Each composition in core and shell Average composition of precursor | r1 | r2 | t1 (μm) |
|---|---|---|---|---|
| Example 1 Example 4 | Core: $Ni_{0.66}Co_{0.22}Mn_{0.22}(OH)_2$ Shell: $Ni_{1/3}Co_{1/3}Mn_{1/3}(OH)_2$ Average composition: $Ni_{0.604}Co_{0.204}Mn_{0.192}(OH)_2$ | 4.27 | 5.99 | 0.11 |
| Example 2 Example 5 | Core: $Ni_{0.8}Co_{0.1}Mn_{0.1}(OH)_2$ Shell: $Ni_{1/3}Co_{1/3}Mn_{1/3}(OH)_2$ Average composition: $Ni_{0.591}Co_{0.213}Mn_{0.197}(OH)_2$ | 5.02 | 6.39 | 1.75 |
| Example 3 Example 6 | Core: $Ni_{0.8}Co_{0.1}Mn_{0.1}(OH)_2$ Shell: $Ni_{1/3}Co_{1/3}Mn_{1/3}(OH)_2$ Average composition: $Ni_{0.610}Co_{0.198}Mn_{0.192}(OH)_2$ | 3.13 | 4.41 | 1.13 |

Particle sizes of the nickel-based active material precursors prepared according to Examples 1 to 6 were analyzed in terms of D10, D50, and D90, and the results are shown in Table 2 below. In Table 2, D10, D50, and D90 respectively refer to cumulative particle diameters at 10%, 50%, and 90% of a total cumulative particle diameter distribution of particles from the smallest particle diameter.

TABLE 2

| | D10 | D50 | D90 |
|---|---|---|---|
| Example 1 Example 4 | 7.4 | 11.779 | 16.554 |
| Example 2 Example 5 | 9.813 | 15.206 | 21.182 |
| Example 3 Example 6 | 7.686 | 10.794 | 14.805 |
| Comparative Example 1 | 10.355 | 11.990 | 13.695 |

Evaluation Example 2: Composition Analysis

Compositions of the nickel-based active precursors prepared according to Examples 1 to 6 and Comparative Example 1 were analyzed by Inductively Coupled Plasma (ICP), and the results are shown in Table 3 below.

TABLE 3

| Mole (%) | Example 1, 4 | Example 2, 5 | Example 3, 6 | Comparative Example 1 |
|---|---|---|---|---|
| Ni (mol %) | 0.604 | 0.591 | 0.610 | 0.607 |
| Co (mol %) | 0.204 | 0.213 | 0.198 | 0.197 |
| Mn (mol %) | 0.192 | 0.197 | 0.192 | 0.196 |

Referring to Table 3, it was confirmed that the nickel-based active precursors prepared according to Examples 1 to 6 and Comparative Example 1 each contained nickel, cobalt, and manganese at a molar ratio of about 6:2:2.

Evaluation Example 3: Scanning Electron Microscopy (SEM)-Energy Dispersion Spectroscopy (EDS)

Cross-sections of the nickel-based active precursors prepared according to Examples 1 to 6 were subjected to SEM-EDS, and the SEM-EDS results are shown in Tables 4 and 5 below. Table 4 shows the results regarding the nickel-based active precursors prepared according to Examples 1 and 4, Table 5 shows the results regarding the nickel-based active precursors prepared according to Examples 2 and 5, and Table 5 shows the results regarding the nickel-based active precursors prepared according to Examples 3 and 6.

TABLE 4

|    | Shell (at. %) | Second core (at. %) | Porous first core (at. %) |
|----|---------------|---------------------|---------------------------|
| Ni | 49.9          | 61.8                | 86.6                      |
| Co | 28.7          | 17.9                | 9.7                       |
| Mn | 21.4          | 20.3                | 3.7                       |

TABLE 5

|    | Shell (at. %) | Second core (at. %) | Porous first core (at. %) |
|----|---------------|---------------------|---------------------------|
| Ni | 40.9          | 70.2                | 83.9                      |
| Co | 31.9          | 14.9                | 8.7                       |
| Mn | 27.2          | 14.9                | 7.4                       |

TABLE 6

|    | Shell (at. %) | Second core (at. %) | Porous first core (at. %) |
|----|---------------|---------------------|---------------------------|
| Ni | 39.3          | 78.5                | 88.1                      |
| Co | 31.6          | 10.8                | 7.1                       |
| Mn | 29.1          | 10.7                | 4.8                       |

Referring to the table above, it was confirmed that the nickel-based active precursors prepared according to Examples 1 to 6 were synthesized with different compositions of the core and the shell.

Evaluation Example 4: SEM Analysis

Surfaces and cross-sections of particles of the nickel-based active material precursor prepared according to Examples 1 to 6 and Comparative Example 1 were analyzed using a scanning electron microscope (SEM). A Magellan 400L (FEI company) was used as the scanning electron microscope. Cross-sections of samples were preprocessed by milling using a CP2 manufactured by JEOL at 6 kV and 150 pA for 4 hours. In addition, the SEM analysis was performed at 350 V.

As a result of SEM analysis, it was confirmed that the nickel-based active precursors prepared according to Examples 1 to 6 each had a structure in which pores were formed and the surface density was not high, unlike the case of Comparative Example 1.

Evaluation Example 5: Charging and Discharging Characteristics (Initial Efficiency)

First, each of the coin half-cells prepared according to Preparation Examples 1 to 6 and Comparative Manufacture Example 1 was charged and discharged once with 0.1 C for formation, and then, was charged and discharged once with 0.2 C to identify initial charging and discharging characteristics. While repeating the charge/discharge process 50 times with 1 C at 45° C., cycle characteristics were examined. The charge process was set to begin in a constant current (CC) mode, be converted into a constant voltage (CV) mode, and be cut off at 4.3 V with 0.05 C, and the discharge process was set to be cut off in a CC mode at 3.0 V.

(1) Initial Charge/Discharge Efficiency (I.C.E)

Measurement was performed according to Equation 1 below.

Initial charge/discharge efficiency [%]=[Discharge capacity at $1^{st}$ cycle/Charge capacity at $1^{st}$ cycle]×100     [Equation 1]

Initial charge/discharge efficiencies of each of the coin half-cells were shown in Table 7 below.

TABLE 7

|                                  | Charge capacity (mAh/g) | Discharge capacity (mAh/g) | I.C.E (%) |
|----------------------------------|-------------------------|----------------------------|-----------|
| Manufacture Example 1            | 196.5                   | 182.5                      | 92.9      |
| Manufacture Example 2            | 195.1                   | 182.6                      | 93.6      |
| Manufacture Example 3            | 197.9                   | 183.2                      | 92.6      |
| Manufacture Example 4            | 192.4                   | 183.2                      | 95.2      |
| Manufacture Example 5            | 191.6                   | 181.1                      | 94.5      |
| Manufacture Example 6            | 193.5                   | 185.3                      | 95.7      |
| Comparative Manufacture Example 1| 200.0                   | 180.9                      | 90.5      |

Referring to Table 7, the coin half-cells according to Preparation Examples 1 to 6 had higher initial charge/discharge efficiencies than that of Comparative Manufacture Example 1.

Evaluation Example 6: Charging and Discharging Characteristics (Rate Capability)

The rate capability of each of the coin half-cells prepared according to Preparation Examples 1 to 6 and Comparative Manufacture Example 1 was evaluated according to the following method.

Each of the coin half-cells prepared according to Preparation Examples 1 to 6 and Comparative Manufacture Example 1 was charged under the conditions of a constant current (0.2 C) and a constant voltage (4.3 V, 0.05 C cut-off), rested for 10 minutes, and discharged under the conditions of a constant current (0.2 C, ⅓ C, 0.5 C, 1 C, 2 C, or 3 C) until the voltage reached 3.0 V. That is, high-rate discharge characteristics (rate capabilities) of each coin half-cell were evaluated by periodically changing the discharge rate at 0.2 C, ⅓ C, 0.5 C, 1 C, 2 C, or 3 C while the number of charging and discharging cycles increases. However, each cell was discharged at a rate of 0.1 C during the $1^{st}$ to $3^{rd}$ charging and discharging cycles.

In this regard, the high-rate discharge characteristics are represented by Equation 2, and the discharge results representatively at 0.2 C and 1 C were Table 6 below.

Rate capability (%)=(Discharge capacity when discharging cell at predetermined constant current rate)/(Discharge capacity when discharging cell at 0.1 C rate)×100     <Equation 2>

TABLE 8

|  | Rate capability (@0.2 C/0.1 C) | Rate capability (@1.0 C/0.1 C) |
|---|---|---|
| Manufacture Example 1 | 98.4 | 93.2 |
| Manufacture Example 2 | 97.8 | 93.7 |
| Manufacture Example 3 | 98.2 | 93.2 |
| Manufacture Example 4 | 98.1 | 95.1 |
| Manufacture Example 5 | 99.6 | 94.7 |
| Manufacture Example 6 | 98.5 | 95.5 |
| Comparative Manufacture Example 1 | 97.5 | 90.2 |

Referring to Table 8, it was confirmed that the coin half-cells prepared according to Preparation Examples 1 to 6 had excellent rate capability.

Evaluation Example 7: Lifespan Characteristics (25° C.)

The coin half-cells prepared according to Manufacture Examples 1 to 3 and Comparative Manufacture Example 1 were subjected to charging and discharging cycle at 25° C. The coin half-cells prepared according to Preparation Examples 1 to 3 and Comparative Preparation Examples 1 and 2 were charged under the conditions of a constant current of 0.1 C at 25° C. in the first cycle, and discharged under the conditions of a constant current of 0.1 C until the voltage reached 3.0 V. Under the same conditions as the first cycle, the second cycle and the third cycle were repeatedly performed.

In the fourth cycle, the lithium secondary battery which underwent the third cycle was charged under the conditions of a constant current of 0.2 C at 25° C. until the voltage reached 4.5 V, and discharged under the conditions of a constant current of 0.2 C until the voltage reached 3.0 V.

In the fifth cycle, the lithium secondary battery after which underwent the fourth cycle was charged under the conditions of 0.1 C at 25° C. until the voltage reached 4.5 V, and discharged under the conditions of a constant current of 0.1 C until the voltage reached 3.0 V. The cycle was repeatedly performed from the $6^{th}$ cycle to the $200^{th}$ cycle under the same conditions as the $5^{th}$ cycle.

Figure 6:
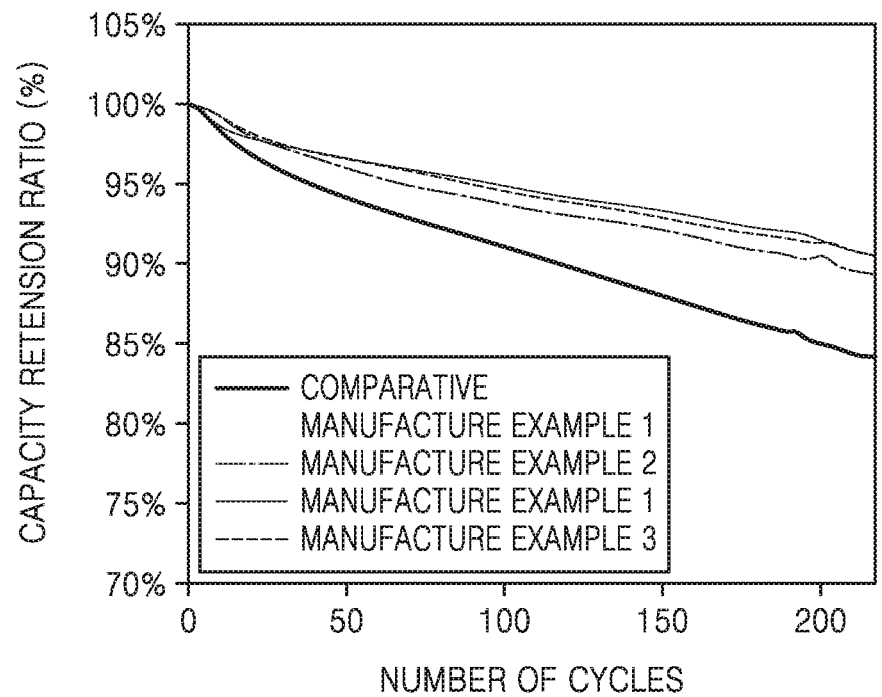
FIG. 6 shows lifespan characteristics at room temperature of coin half-cells manufactured according to Preparation Examples 1 to 3 and Comparative Manufacture Example 1.

By examining the capacity changes in the coin half-cells according to the number of the cycles, the capacity retention ratio was calculated and shown in FIG. 6.

Referring to FIG. 6, it was confirmed that the coin half-cells prepared according to Preparation Examples 1 to 3 had improved lifespan at room temperature compared with the coin half-cell prepared according to Comparative Manufacture Example 1.

Evaluation Example 8: Lifespan Characteristics (45° C.)

The coin half-cells prepared according to Preparation Examples 1 to 3 and Comparative Manufacture Example 1 were subjected to charging and discharging cycle at 45° C.

The coin half-cells prepared according to Preparation Examples 1 and 2 and Comparative Preparation Examples 1 and 2 were charged under the conditions of a constant current of 0.1 C at 45=C in the first cycle until the voltage reached 4.5 V, and discharged under the conditions of a constant current of 0.1 C until the voltage reached 3.0 V. Under the same conditions as the first cycle, the second cycle and the third cycle were repeatedly performed.

In the fourth cycle, the lithium secondary battery which underwent the third cycle was charged under the conditions of a constant current of 0.2 C at 45° C. until the voltage reached 4.5 V, and discharged under the conditions of a constant current of 0.2 C until the voltage reached 3.0 V.

In the fifth cycle, the lithium secondary battery after which underwent the fourth cycle was charged under the conditions of a constant current of 0.1 C at 45° C. until the voltage reached 4.5 V, and discharged under the conditions of a constant current of 0.1 C until the voltage reached 3.0 V. The cycle was repeatedly performed from the $6^{th}$ cycle to the $200^{th}$ cycle under the same conditions as the $5^{th}$ cycle.

Figure 7:
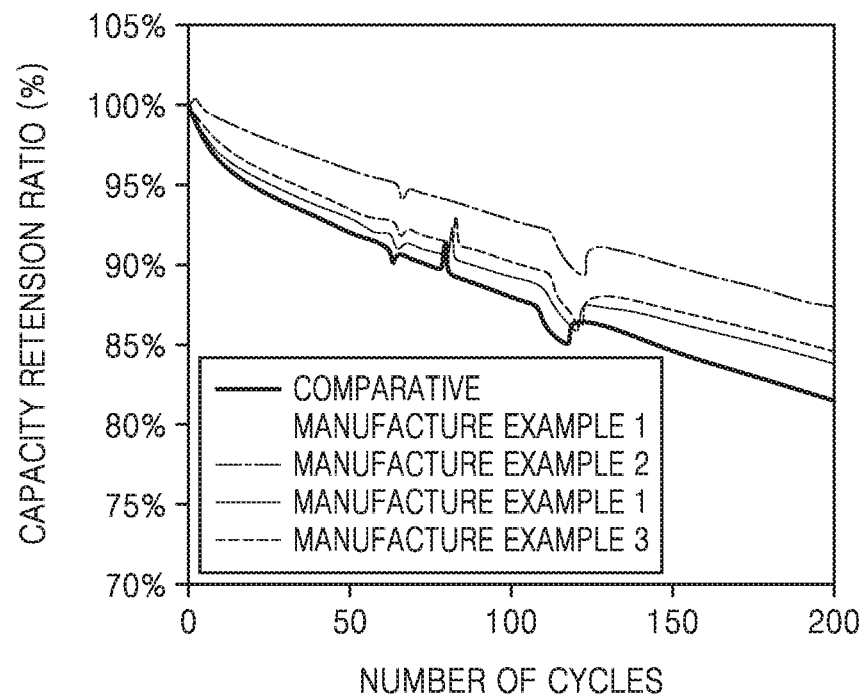
FIG. 7 shows lifespan characteristics at high temperature of coin half-cells manufactured according to Preparation Examples 1 to 3 and Comparative Preparation Examples 1 and 2.

By examining the capacity changes in the coin half-cells according to the number of the cycles, the capacity retention ratio was calculated and shown in FIG. 7.

Referring to FIG. 7, it was confirmed that the coin half-cells prepared according to Preparation Examples 1 to 3 had improved lifespan at high temperatures compared with the coin half-cell prepared according to Comparative Manufacture Example1.

Evaluation Example 9: Porosity of Nickel-Based Active Precursor

SEM analysis was also carried out on the nickel-based active material precursors prepared according to Example 1 and Comparative Example 1.

A Magellan 400L (FEI company) was used as the scanning electron microscope. Cross-sections of samples were preprocessed by milling using a CP2 manufactured by JEOL at 6 kV and 150 pA for 4 hours. In addition, the SEM analysis was performed at 350 V.

The analysis results are shown in Table 9 below.

TABLE 9

|  |  | Porosity (%) |
|---|---|---|
| Example 1 | Porous first core | 35.0 |
|  | Second core | 4.8 |
|  | Shell | 9.2 |
| Comparative Example 1 | Porous first core | 3.6 |
|  | Second core | 2.4 |
|  | Shell | 3.3 |

Evaluation Example 10: Diameter Ratio and Volume Ratio of Nickel-Based Active Precursor The diameter ratio and the volume ratio of the first core which is porous, the second core, and the shell in the nickel-based active material precursors prepared according to Examples 1 to 6 were measured using a particle size analyzer, and the results are shown in Table 10 below.

TABLE 10

|  | First core among first core and second core | | Core (First core + Second core) | | Shell | |
|---|---|---|---|---|---|---|
|  | Diameter ratio (%) | Volume ratio (%) | Diameter ratio (%) | Volume ratio (%) | Diameter ratio (%) | Volume ratio (%) |
| Example 1 Example 4 | 80.8 | 52.7 | 79.6 | 50.5 | 20.4 | 49.5 |
| Example 2 Example 5 | 91.6 | 77.0 | 78.5 | 48.5 | 21.5 | 51.7 |
| Example 3 Example 6 | 85.2 | 62 | 99.2 | 97.6 | 0.8 | 2.4 |

The invention claimed is:

1. A nickel-based active precursor for a lithium secondary battery, comprising:
a first porous core;
a second core located on the first porous core and having a higher density than that of the first porous core; and
a shell located on the second core and having a radial arrangement structure,
wherein an amount of nickel included in the first porous core is greater than or equal to an amount of nickel included in the second core, and the amount of nickel included in the second core is greater than an amount of nickel included in the shell, and
wherein the first porous core has a porosity of 20% to 50%, the second core has a porosity of 5% or less, and the shell has a porosity of 10% or less.

2. The nickel-based active precursor of claim 1, wherein the nickel-based active precursor has a particle size of 9 μm to 20 μm.

3. The nickel-based active precursor of claim 1, wherein the nickel in the shell has a concentration gradient.

4. The nickel-based active precursor of claim 1, wherein the amount of the nickel in the shell rapidly decreases toward a surface portion of the shell in an area where the second core and the shell are adjacent to each other, and
an amount of nickel included in the surface portion of the shell is reduced by 30% to 60% based on an amount of nickel included in the area where the second core and the shell are adjacent to each other.

5. The nickel-based active precursor for a lithium secondary battery of claim 1, wherein
the nickel in the second core and the shell has a concentration gradient in which the amount of nickel decreases from a central portion to a surface portion of the nickel-based active precursor.

6. The nickel-based active precursor of claim 1, wherein the nickel-based active precursor comprises plate particles,
major axes of the plate particles are arranged in a radial direction, and
the plate particles have an aspect ratio of 1:3 to 1:20.

7. The nickel-based active precursor of claim 1, wherein the first porous core has a radius of 3 μm to 6 μm, the second core has a radius of 4 μm to 7 μm, and the shell has a thickness of 0.05 μm to 1.8 μm.

8. The nickel-based active precursor of claim 1, wherein the first porous core and the second core each comprise a compound represented by Formula 1a, and the shell comprises a compound represented by Formula 1b:

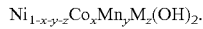 [Formula 1a]

wherein, in Formula 1a, M is an element selected from boron (B), magnesium (Mg), calcium (Ca), strontium (Sr), barium (Ba), titanium (Ti), vanadium (V), tungsten (W), chromium (Cr), iron (Fe), copper (Cu), zirconium (Zr), and aluminum (Al), and
$0.10 < x \leq 0.35$, $0.10 \leq y \leq 0.35$, $0 \leq z \leq 0.05$, and $0.5 \leq (1-x-y-z) \leq 0.80$ are satisfied,

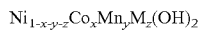 [Formula 1b]

wherein, in Formula 1b, M is an element selected from boron (B), magnesium (Mg), calcium (Ca), strontium (Sr), barium (Ba), titanium (Ti), vanadium (V), tungsten (W), chromium (Cr), iron (Fe), copper (Cu), zirconium (Zr), and aluminum (Al), and
$0.10 < x \leq 0.40$, $0.10 \leq y \leq 0.40$, $0 \leq z \leq 0.05$, and $0.20 \leq (1-x-y-z) \leq 0.50$ are satisfied.

9. The nickel-based active precursor of claim 1, wherein the first porous core and the second core each comprise a compound represented by Formula 1c, and the shell comprises a compound represented by Formula 1b, and
the amount of nickel in the shell rapidly decreases toward a surface portion of the shell in an area where the second core and the shell are adjacent to each other:

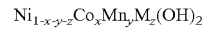 [Formula 1b]

wherein, in Formula 1b, M is an element selected from boron (B), magnesium (Mg), calcium (Ca), strontium (Sr), barium (V), tungsten (W), titanium (Ti), vanadium (V), chromium (Cr), iron (Fe), copper (Cu), zirconium (Zr), and aluminum, and
$0.10 < x \leq 0.40$, $0.10 \leq y \leq 0.40$, $0 \leq z \leq 0.05$, and $0.20 \leq (1-x-y-z) \leq 0.50$ are satisfied,

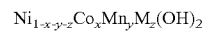 [Formula 1c]

wherein, in Formula 1c, M is an element selected from boron (B), magnesium (Mg), calcium (Ca), strontium (Sr), barium (Ba), titanium (Ti), vanadium (V), tungsten (W), chromium (Cr), iron (Fe), copper (Cu), zirconium (Zr), and aluminum (Al), and
$0.03 < x \leq 0.20$, $0 \leq y \leq 0.20$, $0 \leq z \leq 0.05$, and $0.70 \leq (1-x-y-z) \leq 0.95$ are satisfied.

10. The nickel-based active precursor of claim 9, wherein the amount of nickel in the second core decreases with a gradient from an area adjacent to the first porous core to the shell.

11. A method of producing a nickel-based active precursor of claim 1, the method comprising:
a first step of forming a first porous core; and
a second step of forming a second core located on the first porous core and having a higher density than that of the first porous core,
wherein the nickel-based active precursor comprises a shell located on the second core and comprising a radial arrangement structure,
an amount of nickel in the first porous core is greater than or equal to that of nickel in the second core, and the amount of nickel in the second core is greater than an amount of nickel in the shell, and
wherein the first porous core has a porosity of 20% to 50%, the second core has a porosity of 5% or less, and the shell has a porosity of 10% or less.

12. The method of claim 11, wherein
i) a reaction mixture in each step has a pH of 10 to 12, and a nickel raw material is supplied in the third step at a speed that is decreased as compared with a speed at which a nickel raw material is supplied respectively in the first step and the second step, or
ii) a reaction mixture in each process has a pH of 10 to 12, and a metal raw material is supplied in the second step at a speed that is increased as compared with a speed at which a metal raw material is supplied in the first step while a nickel raw material is supplied in the third step at a speed that is equal to or decreased as compared with a speed at which a metal raw material is supplied in the second step.

13. nickel-based active material for a lithium secondary battery, obtained from the nickel-based active precursor for a lithium secondary battery of claim 1.

14. A lithium secondary battery comprising:
a cathode comprising the nickel-based active material of claim 13;
an anode; and
an electrolyte between the cathode and the anode.

* * * * *